United States Patent
Kelly et al.

(10) Patent No.: US 9,915,354 B2
(45) Date of Patent: Mar. 13, 2018

(54) ROTARY CHECK VALVE

(71) Applicant: Schlumberger Technology Corporation, Sugar Land, TX (US)

(72) Inventors: Robert Kelly, Houston, TX (US); Karidja Louise-Olivia Djibo, Houston, TX (US); Kent D. Harms, Richmond, TX (US); Walter Luckett, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 472 days.

(21) Appl. No.: 14/577,710

(22) Filed: Dec. 19, 2014

(65) Prior Publication Data
US 2016/0177664 A1 Jun. 23, 2016

(51) Int. Cl.
| | | |
|---|---|---|
| *E21B 21/10* | (2006.01) | |
| *E21B 34/08* | (2006.01) | |
| *F16K 3/02* | (2006.01) | |
| *F16K 15/02* | (2006.01) | |
| *F16K 3/08* | (2006.01) | |

(52) U.S. Cl.
CPC ............ *F16K 3/0254* (2013.01); *E21B 34/08* (2013.01); *F16K 3/08* (2013.01); *F16K 15/025* (2013.01)

(58) Field of Classification Search
CPC ...... E21B 21/10; E21B 21/103; E21B 23/006; E21B 34/10; E21B 34/08
See application file for complete search history.

(56) References Cited

U.S. PATENT DOCUMENTS

| | | | | |
|---|---|---|---|---|
| 2,791,398 A | * | 5/1957 | O'Reilly | E21B 25/04 175/249 |
| 4,534,715 A | * | 8/1985 | Jones | E21B 34/06 137/614.2 |
| 5,176,164 A | * | 1/1993 | Boyle | E21B 34/06 137/155 |
| 5,794,699 A | * | 8/1998 | Hammett | E21B 34/14 166/332.3 |
| 6,202,762 B1 | * | 3/2001 | Fehr | E21B 4/02 175/107 |
| 6,378,612 B1 | * | 4/2002 | Churchill | E21B 21/103 166/319 |
| 8,474,485 B2 | | 7/2013 | Harms et al. | |
| 9,145,748 B1 | * | 9/2015 | Meier | E21B 21/103 |
| 2005/0072572 A1 | * | 4/2005 | Churchill | E21B 21/103 166/319 |
| 2006/0284134 A1 | * | 12/2006 | Dwivedi | F16K 5/0428 251/208 |
| 2010/0096190 A1 | * | 4/2010 | Younger | E21B 21/106 175/218 |

(Continued)

*Primary Examiner* — Kipp C Wallace

(57) ABSTRACT

A rotary check valve is disclosed having sealing surfaces between two sealing members that engage with a rotating shearing motion. The rotating shearing motion may shear debris between the sealing members and minimize or eliminate blockage of fluid passageways in the sealing members. In a closed position, the upper sealing member and lower sealing member are rotated such that fluid passageways in the upper sealing member and fluid passageways in the lower sealing member are not aligned and blocked by the sealing surfaces. The sealing members of the rotary check valve may be biased to a closed position via a spring.

7 Claims, 6 Drawing Sheets

(56) References Cited

U.S. PATENT DOCUMENTS

| | | | |
|---|---|---|---|
| 2014/0014413 A1* | 1/2014 | Niina | E21B 7/062 175/61 |
| 2014/0083776 A1* | 3/2014 | Hogset | E21B 21/12 175/57 |
| 2014/0131029 A1 | 5/2014 | Harms et al. | |

* cited by examiner

ROTARY CHECK VALVE

BACKGROUND

This disclosure relates to control of fluids and, more particularly, to a rotary check valve for controlling fluid flow.

Downhole drilling operations may include the use of drilling tools used for measuring, logging, or sampling while drilling. During such operations, wellbore and formation fluids may be pumped through various components. A combination of mud check valves may be used to control the flow direction of wellbore and formation fluids. Such valves may also be used in other tools, such as wireline tools having downhole fluid analysis capabilities. Mud check valves used in these applications may be susceptible to clogging via sand or other materials in a fluid. Additionally, due to abrasive fluid flow, the seal interfaces of such valves may erode during actuation or open flow. Check valves that use a spring energized ball on an elastomeric seal may experience both clogging and erosion.

SUMMARY

A summary of certain embodiments and associated aspects disclosed herein is set forth below. It should be understood that these aspects are presented merely to provide the reader with a brief summary of these certain embodiments and that these aspects are not intended to limit the scope of this disclosure. Indeed, this disclosure may encompass a variety of embodiments and aspects that may not be set forth below.

Embodiments of this disclosure relate to a valve and systems including the valve. In some embodiments, a valve having a housing disposed around an axis is provided. The valve includes a first rotating member disposed within the housing and configured to rotate around the axis in a first circumferential direction, the first rotating member having a first sealing surface and at least one first fluid passageway. The valve also includes a second rotating member disposed within the housing and coaxial to the first rotating member, the second member configured to rotate around the axis in a second circumferential direction opposite the first circumferential direction, the second member having a second sealing surface that includes at least one second fluid passageway. When the valve is in a closed position, the first sealing surface engages the second sealing surface to close the at least one first fluid passageway and at least one second fluid passageway. When the valve is in an open position, the first rotating member and the second rotating member are rotated such that the at least one first fluid passageway and at least second fluid passageway are aligned.

In some embodiments, another valve is provided having a housing that includes a first pin and second pin and a body member disposed in the housing. The valve includes a first rotating member disposed in the body member and having a first sealing surface and a first fluid passageway. The first rotating member includes a first helical groove configured to receive the first pin such that movement of the pin along the helical groove correlates to rotation of the first rotating member between a closed position and an open position. The valve also includes a second rotating member disposed in the body member and having a second sealing surface and a second fluid passageway. When the valve is in a closed position, the first sealing surface the first sealing surface engages the second sealing surface to close the first fluid passageway. When the valve is in an open position, the first rotating member is rotated to open the first fluid passageway. When the valve is in an open position, the first rotating member is rotated to open the first fluid passageway.

In some embodiments, a system is provided having a downhole tool that includes a pump and a valve coupled to the pump. The valve includes a housing disposed around an axis. The valve includes a first rotating member disposed within the housing and configured to rotate around the axis in a first circumferential direction, the first rotating member having a first sealing surface and at least one first fluid passageway. The valve also includes a second rotating member disposed within the housing and coaxial to the first rotating member, the second member configured to rotate around the axis in a second circumferential direction opposite the first circumferential direction, the second member having a second sealing surface that includes at least one second fluid passageway. When the valve is in a closed position, the first sealing surface engages the second sealing surface to close the at least one first fluid passageway and at least one second fluid passageway. When the valve is in an open position, the first rotating member and the second rotating member are rotated such that the at least one first fluid passageway and at least second fluid passageway are aligned.

BRIEF DESCRIPTION OF THE DRAWINGS

Various embodiments and associated aspects of this disclosure may be better understood upon reading the following detailed description and upon reference to the drawings in which.

DETAILED DESCRIPTION

Figure 1:
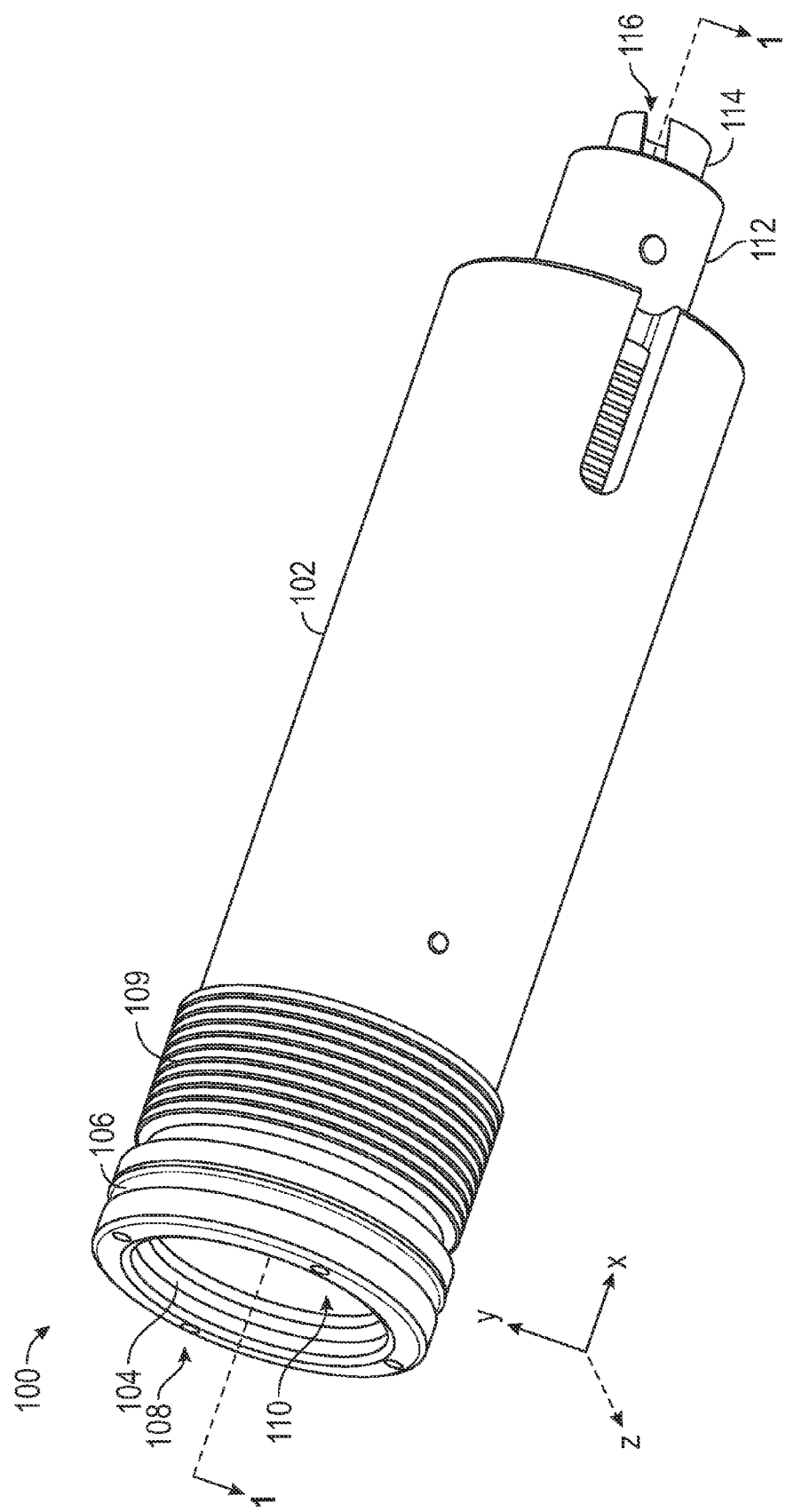
FIG. 1 is a perspective view of a rotary check valve in accordance with an embodiment of the disclosure.

Described herein are various implementations related to a rotary check valve for controlling fluid flow. In one embodiment, a rotary check valve having sealing surfaces between two sealing members that engage with a rotating shearing motion can be provided. The rotating shearing motion may shear debris between the sealing members and minimize or eliminate blockage of fluid passageways in the sealing members. In some embodiments, the rotary check valve may include a body member and a stem member disposed in a housing around a central axis. A co-axial upper sealing member may be disposed in the body member, and a co-axial lower sealing member may be coupled to an end of the stem member. In the closed position, the upper sealing member and lower sealing member are rotated such that fluid passageways in the upper sealing member and fluid passageways in the lower sealing member are not aligned and not blocked by the sealing surfaces. The sealing members of the rotary check valve may be biased to the closed position via a spring disposed in the housing.

The rotary check valve may move to the open position when fluid pressure against an end of the rotary check valve exceeds a pressure threshold sufficient to compress the spring. In the open position, the body member, upper sealing member, and lower sealing member translate with respect to the housing and rotate around the central axis to partially or fully align the fluid passageways in the upper sealing member and lower sealing member to create a fluid flow path. In the open position, fluid may flow through the fluid flow path created by the partial or full alignment of the fluid passageways in the upper sealing member and lower sealing member.

In some embodiments, movement of the members of the valve is enabled via engagement of an upper pin and a lower pin extending from the housing with helical grooves in the body member and the stem member. In such embodiments, an upper pin extending from the housing toward the central axis may engage an upper helical groove formed in the body member and extending in a circumferential direction. A lower pin extending from the housing toward the central axis may engage a lower helical groove formed in the stem member and extending in a circumferential direction opposite the upper helical groove. Movement of the upper pin along the upper helical groove may enable translation and rotation of the body member and upper sealing member with respect to the housing. Movement of the lower pin along the lower helical groove may enable translation and rotation of the lower sealing member with respect to the housing. When the valve moves to the closed position, the opposite rotations of the upper sealing member and lower sealing member may create a shearing force between the sealing surfaces of each member to shear any debris or material between the sealing surfaces or protruding from the fluid passageways in the sealing members.

These and other embodiments of the disclosure will be described in more detail through reference to the accompanying drawings in the detailed description of the disclosure that follows. This brief introduction, including section titles and corresponding summaries, is provided for the reader's convenience and is not intended to limit the scope of the claims or the proceeding sections. Furthermore, the techniques described above and below may be implemented in a number of ways and in a number of contexts. Several example implementations and contexts are provided with reference to the following figures, as described below in more detail. However, the following implementations and contexts are but a few of many.

FIG. 1 is a perspective view of a rotary check valve 100 in a closed position in accordance with an embodiment of the disclosure. As shown in FIG. 1, the rotary check valve 100 includes a housing 102 having an inner seal 104 (e.g., an o-ring) and an outer seal 106 (e.g., an o-ring). As depicted in FIG. 1, the housing 102 includes an opening 108 into a fluid passageway 110. In some embodiments, the housing 102 may include threads 109 for coupling to a pipe or other fluid flow component. The housing 102 may include a protrusion 112 having a reduced diameter. The protrusion 112 may accommodate a stem member 114, a portion of which is illustrated extending from the protrusion 112. An end of the stem member 114 may include an opening 116 that connects to the fluid passageway 110. In the closed position, as described further below, sealing members of the valve 100 may translate and rotate to prevent fluid flow through the fluid passageway 110 and out of the opening 116.

Figure 2:
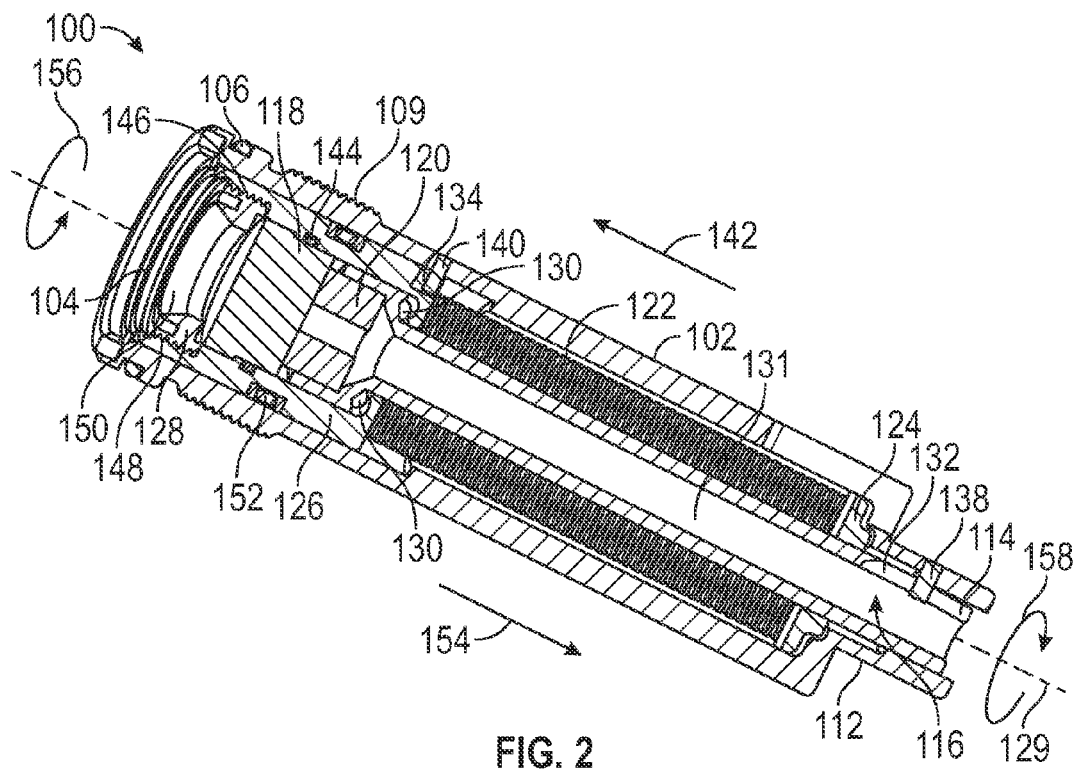
FIG. 2 is a cross-section taken along line 1-1 of FIG. 1 that shows the rotary check valve in a closed position in accordance with an embodiment of the disclosure.
Figure 3:
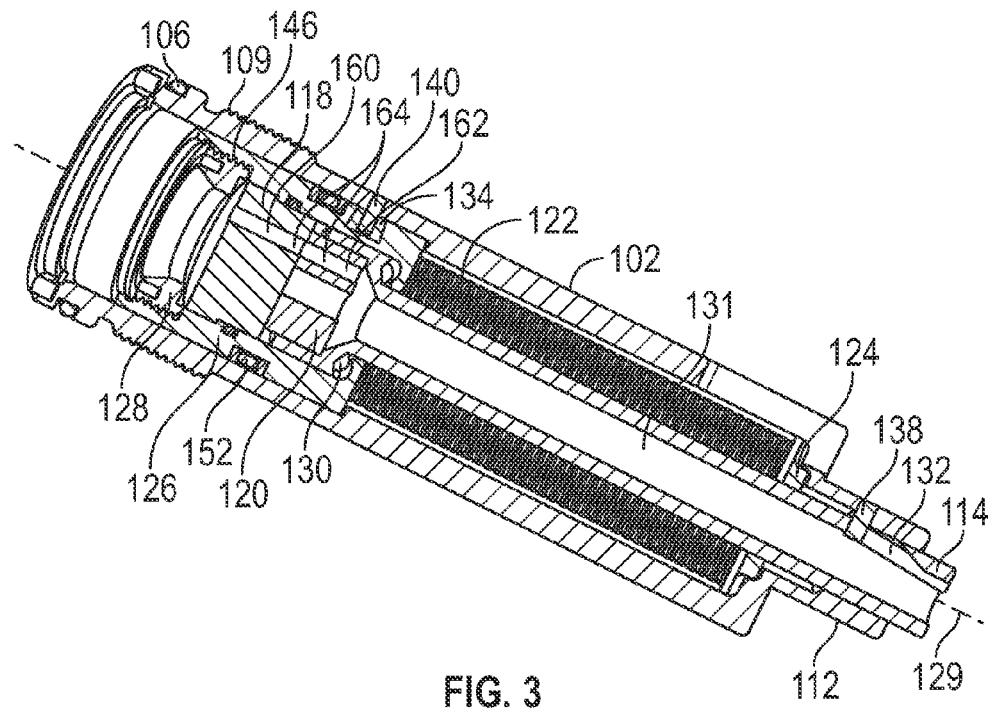
FIG. 3 is a cross-section taken along line 1-1 of FIG. 1 that shows the rotary check valve in an open position in accordance with an embodiment of the disclosure.
Figure 4:
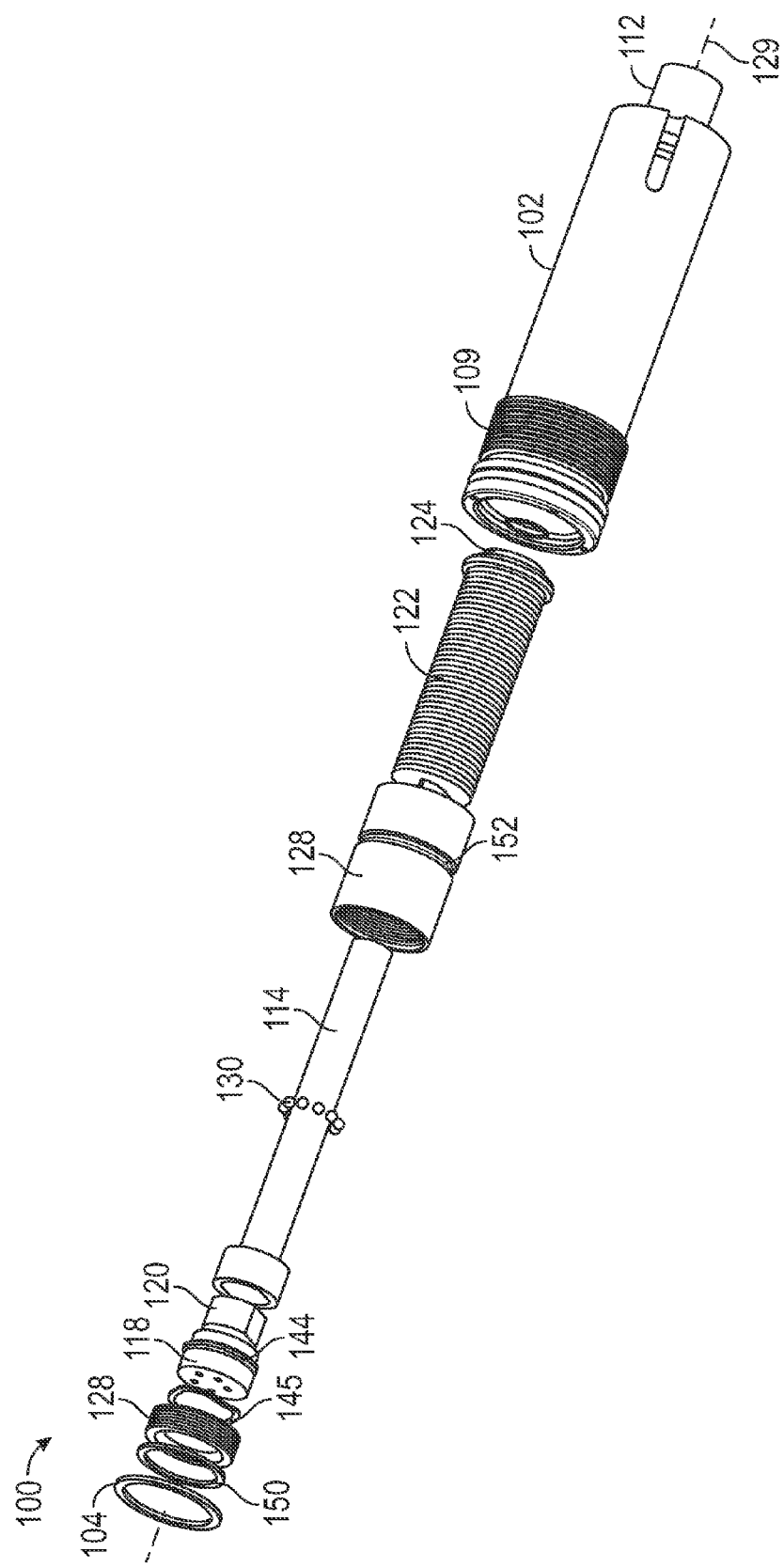
FIG. 4 is an exploded view of the rotary check valve of FIG. 1 in accordance with an embodiment of the disclosure.

The features of the valve 100 will be described in further detail with reference to FIGS. 2-4. FIGS. 2 and 3 depict cross-sections of the rotary check valve 100 taken along line 1-1 of FIG. 1 and in a closed position and open position respectively in accordance with an embodiment of the disclosure. FIG. 4 depicts an exploded perspective view of the valve 100 in accordance with an embodiment of the disclosure. Some features of the valve 100 may be omitted from one or more of FIGS. 2, 3, and 4 for clarity. Although some features are described as "upper" and "lower" with respect to each other it should be appreciated that the terms upper and lower do not designate any particular orientation of the valve 100 or the features described herein. As shown in FIGS. 2-4, the valve 100 includes the housing 102, the stem member 114 having the opening 116, an upper sealing member 118, a lower sealing member 120, a spring 122, a spring end member 124, a body member 126, and a ring member 128 disposed around a central axis 129.

The stem member 114 is coupled to the lower sealing member 120. In some embodiments, bearings 130 may be disposed between the lower sealing member 120 and the stem member 114. The stem member 114 may include a fluid passageway 131 formed in and extending through the stem member 114. The fluid passageway 131 may connect the opening 116 of the stem member 114 to fluid passageways in the lower sealing member 120 that are described further below.

The stem member 114 may include a helical groove 132 extending along a portion of the stem member 114. The body member 126 may include a helical groove 134 extending along a portion of the body member 126. As shown in FIG. 2, the housing 102 may include or be coupled to a lower pin 138 configured to engage the helical groove 132 of the stem member 114. Similar, the housing 102 may include an upper pin 140 configured to engage the helical groove 134 of the body member 126. As explained further below, rotation and translation of the stem member 114 as enabled by movement of the lower pin 138 along the helical groove 132 may rotate the lower sealing member 120. Similarly, rotation and translation of the body member 126 as facilitated by movement of the upper pin 140 along the helical groove 134 may rotate the upper sealing member 118. In this manner, lower sealing member 120 and upper sealing member 118 may rotate to partially or fully align fluid passageways disposed within the sealing members 120 and 118. When the valve 100 is in the closed position, the upper sealing member 118 may include fluid passageways that are not aligned with fluid passageways in the lower sealing member 120.

The spring 122 may be disposed in the housing 102. An end of the spring 122 may engage the spring end member 124, and the other end of the spring 122 may engage the body member 126. The spring 122 may bias the components of the valve 100 in the direction illustrated by arrow 142 to the closed position illustrated in FIG. 2. For example, as shown in FIG. 2, in the closed position the lower pin 138 may be at an end of the helical groove 132 and the upper pin 140 may be at an end of the helical groove 134. In some embodiments, the spring 122 may be a Belleville-type spring. In other embodiments, other types of springs may be used.

The upper sealing member 118 may be coupled to the body member 126. In some embodiments, a seal 144 (e.g., an o-ring) may be disposed between the upper sealing member 118 and the body member 126. In some embodiments, as shown in FIG. 4, a seal 145 may be disposed between the upper sealing member 118 and the ring member 128. The ring member 128 may be coupled to the body member 126 via external threads 146 on the ring member 128 and internal threads 148 on the body member 126. In some embodiments, a seal 150 (e.g., an o-ring) may be disposed between the ring member 128 and the body member 126. In some embodiments, a seal 152 (e.g., an o-ring) may be disposed between the body member 126 and the housing 102.

The valve 100 may open when the fluid pressure against the opening 108 of the valve 100 exceeds a pressure threshold sufficient to compress the spring 122. When the fluid pressure exceeds the pressure threshold, the movement of the pins 138 and 140 along the helical grooves 132 and 134 respectively enables the translation of components of the valve 100 along the axis and rotation of such components around the axis such that fluid passageways in the upper sealing member and lower sealing member are partially or fully aligned. As shown in FIG. 2, in such instances, the movement of the upper pin 140 along the helical groove 134 may enable translation of the body member 126, the ring member 128, and the upper sealing member 118 along the axis in the direction indicated by arrow 154. The movement of the of the upper pin 140 along the helical groove 134 may also enable rotation of the body member 126, the ring member 128, and the upper sealing member 118 around the axis 129 in the circumferential direction indicated by arrow 156. Similarly, the movement of the lower pin 138 along the helical groove 132 may enable rotation of the lower sealing member 120 and the stem member 114 around the axis in the circumferential direction indicated by arrow 158.

FIG. 3 depicts a cross-section of the rotary check valve 100 taken along line 1-1 of FIG. 1 and in an open position in accordance with an embodiment of the disclosure. As shown in FIG. 3, in the open position the upper sealing member 118 and lower sealing member 120 have rotated such that an upper sealing member fluid passageway 160 and a lower sealing member fluid passageway 162 are aligned, creating a fluid flow path 164. It should be appreciated that the upper sealing member 118 and lower sealing member 120 may rotate such that the upper sealing member fluid passageway 160 and the lower sealing member fluid passageway 162 may be partially aligned or fully aligned. For example, the valve 100 may regulate (e.g., throttle) fluid flow through the valve when the passageways 160 and 162 are partially aligned. As shown in FIG. 3, the body member 126, the ring member 128, and the upper sealing member 118 have rotated around axis 129 and translated along axis 129 with respect to the housing 102. The upper pin 140 has moved along the helical groove 134 to enable rotation and translation of the body member 126, the ring member 128, and the upper sealing member 118. As also shown in FIG. 3, the lower sealing member 120 and the stem member 114 have rotated around axis 129 and translated along axis 129 with respect to the housing 102. The lower pin 138 has moved along the helical groove 136 to enable rotation and translation of the lower sealing member 120 and the stem member 114. In the open position, a fluid may flow through the valve via the fluid flow path 164 and the fluid passageway in the stem member 114.

Figure 5:
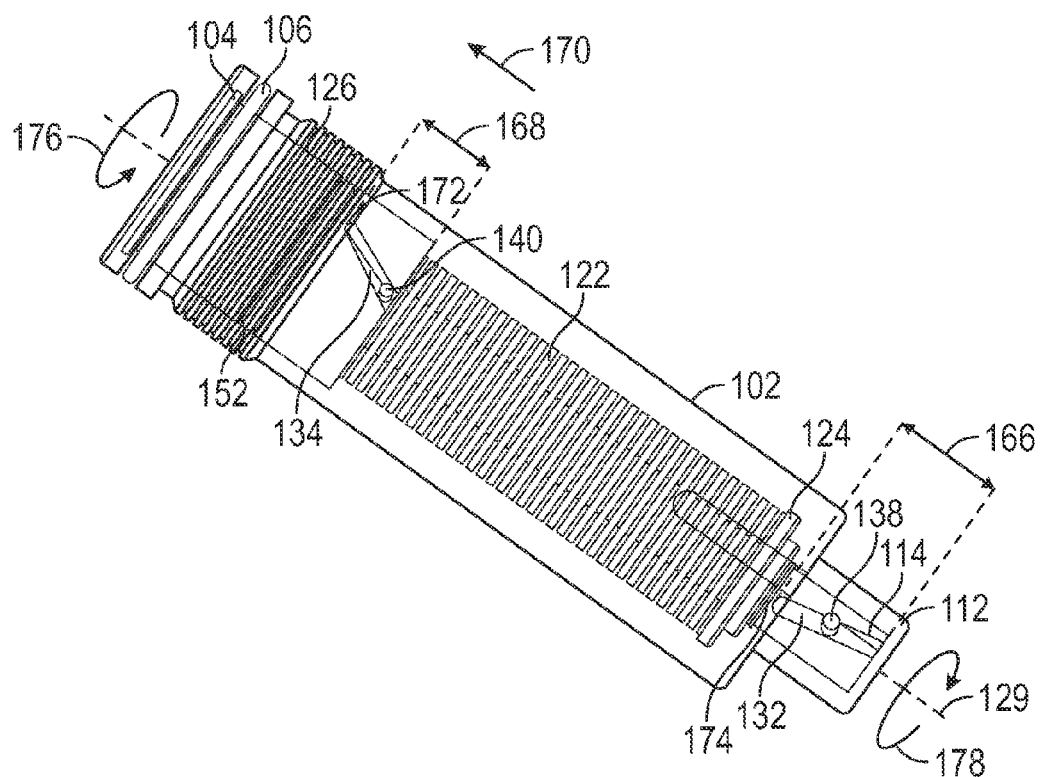
FIG. 5 is another perspective view of the rotary check valve of FIG. 1 with a translucent housing in accordance with an embodiment of the disclosure.

FIG. 5 depicts a side view of the valve 100 in which the housing 102 is translucent in order to further illustrate the features of the valve 100. FIG. 5 depicts the engagement of the lower pin 138 with the helical groove 132 and the upper pin 140 with the helical groove 134. The helical groove 132 may have a length 166 and may extend along a portion of the stem member 114. The lower pin 138 may extend from the housing 102 toward the axis 129 at a length sufficient to engage the helical groove 132. The lower pin 138 may engage the helical groove 132 and move along the groove 136 to enable rotation and translation of the stem member 114 and the lower sealing member 120.

FIG. 5 also depicts engagement of the upper pin 140 with the helical groove 134. The helical groove 134 may have a length 168 and may extend along a portion of the body member 106. The upper pin 140 may extend from the housing 102 toward the axis 129 at a length sufficient to engage the helical groove 134. The upper pin 140 may engage the helical groove 134 and move along the groove 134. For example, when the valve moves from the closed position depicted in FIG. 4 to an open position (as shown in FIG. 3), the upper pin 140 may move along the helical groove 134 in the direction indicated by arrow 170 shown in FIG. 4. In some embodiments, movement of the valve 102 to the open position may be stopped via engagement of a pin with the end of a helical groove. For example, when the valve 100 moves to the open position, as enabled by movement of the upper pin 140 along the helical groove 134, the engagement of the upper pin 140 with an end 172 of the helical groove 134 may cause movement of the body member 126, the ring member 128, and the upper sealing member 118 to cease. Similarly, the engagement of the lower pin 138 with an end 174 of the helical groove 132 may cause movement of the lower sealing member 120 and the stem member 114 to cease.

In some embodiments, as shown in FIG. 5, the helical groove 134 and the helical groove 132 may extend in opposite circumferential directions. For example, as shown in FIG. 4, the helical groove 134 may extend in a circumferential direction 176 and the helical groove 132 may extend in an opposite circumferential direction 178. In some embodiments, multiple upper pins and corresponding helical grooves may be included in the valve 100. In some embodiments, multiple lower pins and corresponding helical grooves may be included in the valve 100.

Figure 6:
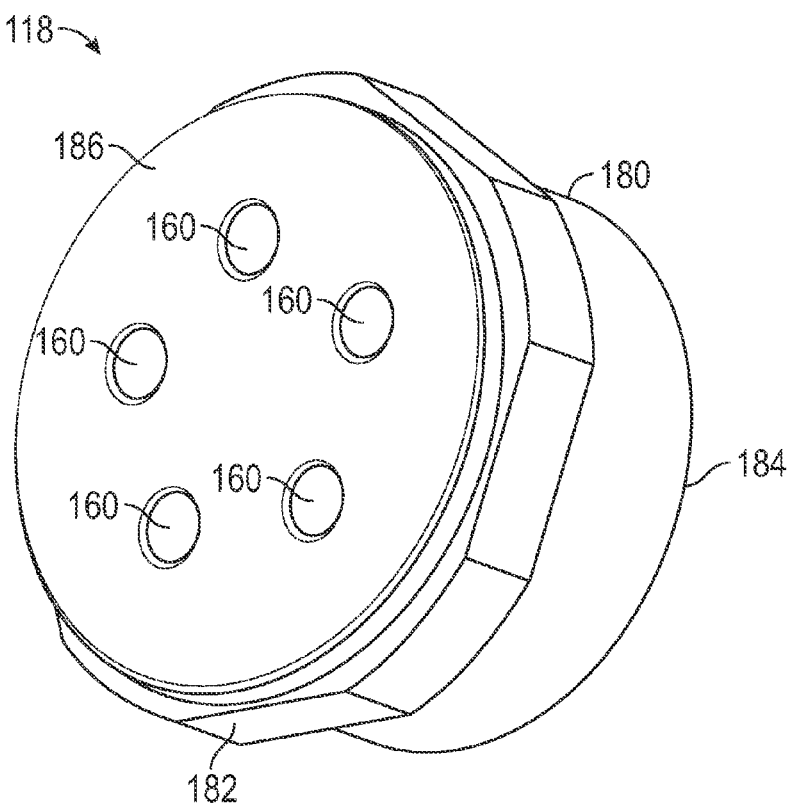
FIG. 6 is a perspective view of a upper sealing member of the rotary check valve of FIG. 1 in accordance with an embodiment of the disclosure.

FIG. 6 depicts a perspective view of the upper sealing member 118 in accordance with an embodiment of the disclosure. The upper sealing member 118 may have an outer surface 180, a portion of which may include a polygonal surface 182 configured to engage a correspondingly polygonal interior portion of the body member 126. The upper sealing member 128 includes sealing surface 184 and surface 186. As shown in FIG. 6, the upper sealing member 118 includes the upper sealing member fluid passageways 160 described above. In the embodiment depicted in FIG. 6, the upper sealing member 118 includes five fluid passageways. In other embodiments, the upper sealing member 128 may include one or more, two or more, three or more, four or more, or six or more fluid passageways. In some embodiments, the upper sealing member 118 may be formed from metal such that the sealing surface 184 is a metal sealing surface. In some embodiments, the upper sealing member 118 may be formed from tungsten carbide.

Figure 7:
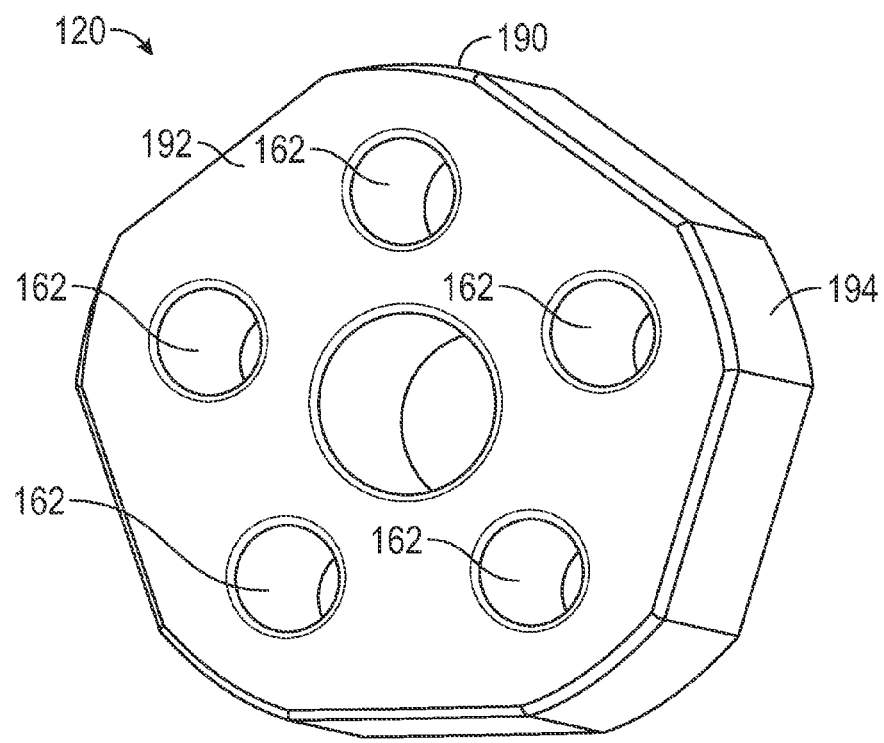
FIG. 7 is a perspective view of a lower sealing member of the rotary check valve of FIG. 1 in accordance with an embodiment of the disclosure.

FIG. 7 depicts a perspective view of the lower sealing member 120 in accordance with an embodiment of the disclosure. The lower sealing member 120 may have a polygonal outer surface 190 configured to engage a corresponding polygonal interior of the stem member 108. As shown in FIG. 7, the lower sealing member 120 may include sealing surface 192 and surface 194 and may include the lower sealing member fluid passageways 162 described above. In the embodiment depicted in FIG. 6, the lower sealing member 120 may include five upper sealing member fluid passageways 162. In other embodiments, the lower sealing member 120 may include one or more, two or more, three or more, four or more, or six or more fluid passageways. In some embodiments, the lower sealing member 120 may be formed from metal, such that the sealing surface 192 is a metal sealing surface. In some embodiments, the lower sealing member 120 may be formed from tungsten carbide.

The sealing surface 184 of the upper sealing member 118 and the sealing surface 192 of the lower sealing member 120 may engage to close the valve 102 and prevent fluid flow through the valve 102. In the closed position, the upper sealing member 118 and the lower sealing member 120 are in a rotated position such that the sealing surface 184 of the upper sealing member 118 blocks the lower sealing member fluid passageways 162 and the sealing surface of the lower sealing member 120 blocks the upper sealing member fluid passageways 160. The rotation of the sealing surfaces 184 and 192 against each other may generate a shearing force sufficient to shear loose material (e.g., debris in the fluid) between the shearing surfaces or protruding from the fluid passageways 160 and 162. The shearing of such material may prevent clogging of the valve and blockage of the fluid passageways 160 and 162. The sheared material may flow through the valve 100 when the valve is re-opened to the open position.

In the open position, the upper sealing member 118 and the lower sealing member 120 are in a rotated position such that the fluid passageways 160 and 162 are partially or fully aligned to create a fluid flow path. For example, in the embodiments depicted in FIGS. 6 and 7, in the open position of the valve 100 the five fluid passageways 162 of the upper sealing member 118 are partially or fully aligned with the five fluid passageways 164 of the lower sealing member 120.

Figure 8:
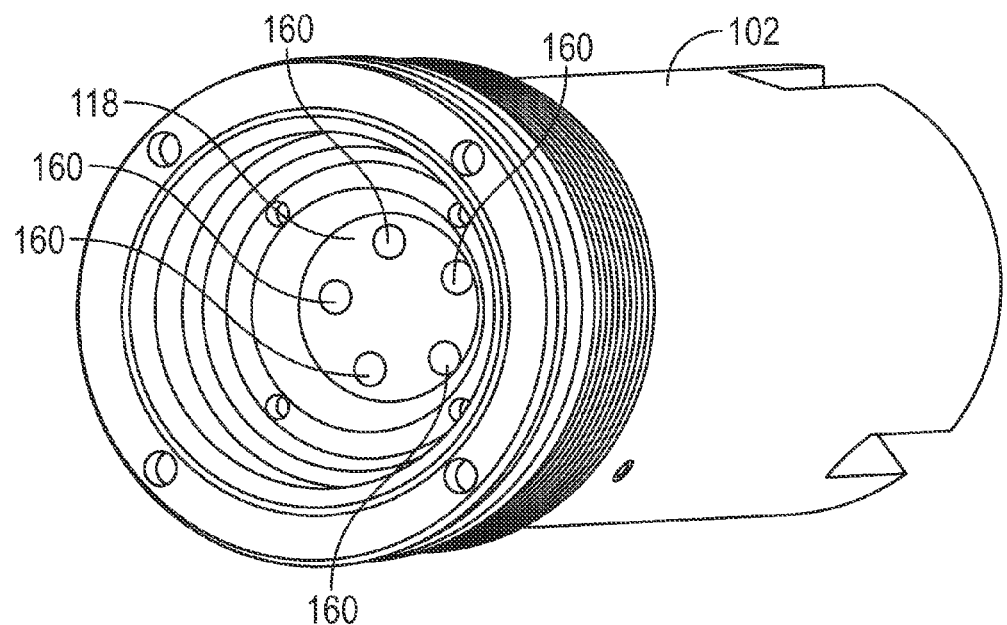
FIG. 8 is a perspective view of an end of the rotary check valve of FIG. 1 in accordance with an embodiment of the disclosure.

FIG. 8 depicts another perspective view of the valve 100 in accordance with an embodiment of the disclosure. As shown in FIG. 8, the five fluid passageways 160 of the upper sealing member 118 are visible inside the housing 102. In the view depicted in FIG. 8, the upper sealing member 118 is visible through the ring member 128. As described above, fluid may enter the valve 100 via the opening 108. As the fluid pressure exceeds a threshold, the fluid pressure on the face 186 of the upper sealing member 118 may move the valve 100 to the open position illustrated above.

Although the valve 100 described above includes an upper sealing member 118 and a lower sealing member 120 that both rotate and translate, in other embodiments other configurations may be used. For example, in some embodiments, the upper sealing member 118 may rotate without translation and the lower sealing member 120 may translate without rotation. In other embodiments, the upper sealing member 118 may translate without rotation and the lower sealing member 120 may rotate without translation.

Figure 9:
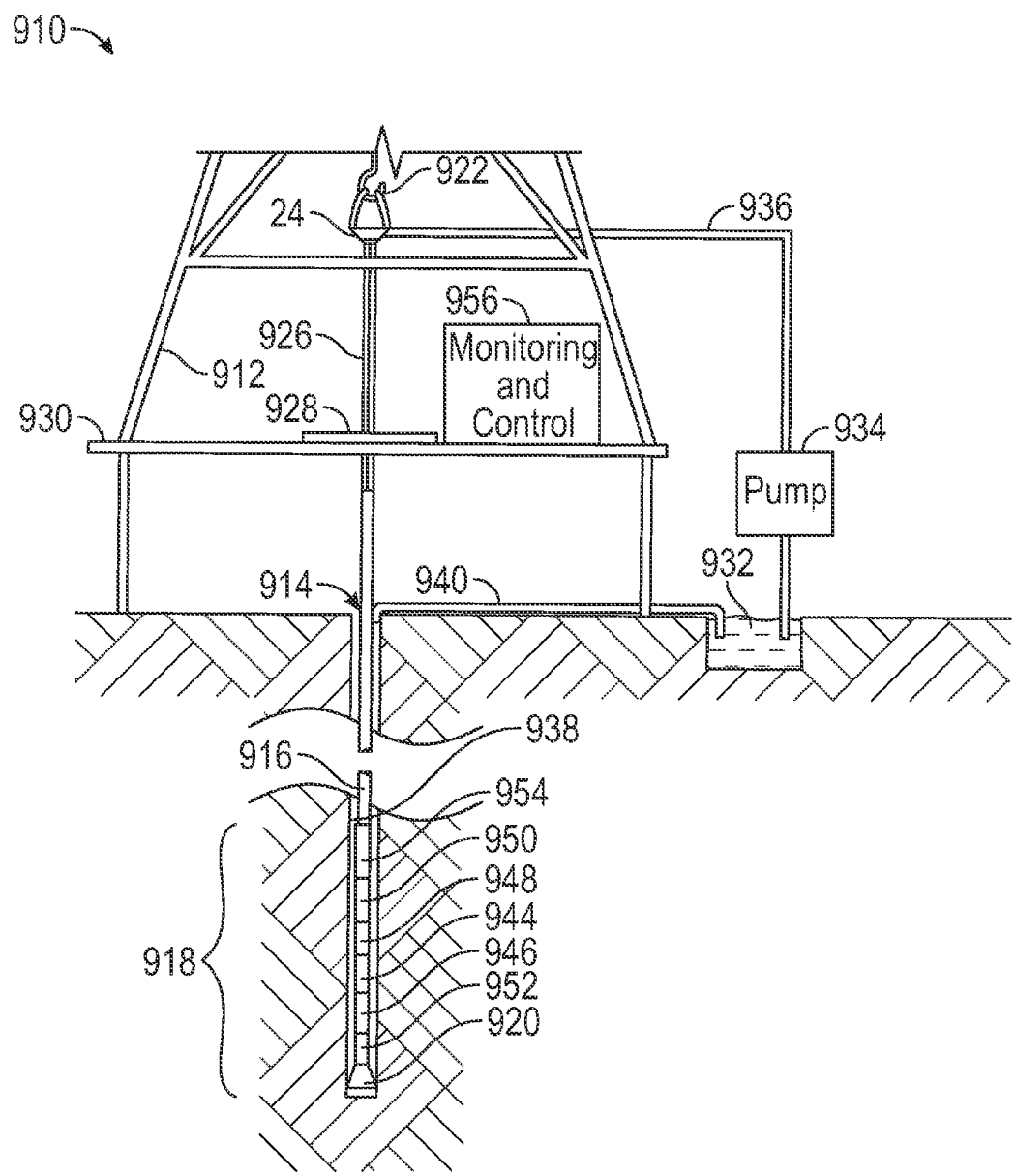
FIG. 9 is a schematic diagram of a drilling system that may use a rotary check valve, such as shown in FIG. 1, in accordance with an embodiment of the disclosure.

In some embodiments, the valve 100 may be used in a drilling system having, for example, logging-while-drilling tools, measuring-while-drilling tools, sampling-while-drilling tools, or a combination thereof. More specifically, a drilling system 910 is depicted in FIG. 9 in accordance with one embodiment. While certain elements of the drilling system 910 are depicted in this figure and generally discussed below, it will be appreciated that the drilling system 910 may include other components in addition to, or in place of, those presently illustrated and discussed. As depicted, the system 910 can include a drilling rig 912 positioned over a well 914. Although depicted as an onshore drilling system 910, it is noted that the drilling system could instead be an offshore drilling system. The drilling rig 912 can support a drill string 916 that includes a bottomhole assembly 918 having a drill bit 920. The drilling rig 912 can rotate the drill string 916 (and its drill bit 920) to drill the well 914.

The drill string 916 can be suspended within the well 914 from a hook 922 of the drilling rig 912 via a swivel 924 and a kelly 926. Although not depicted in FIG. 9, the skilled artisan will appreciate that the hook 922 can be connected to a hoisting system used to raise and lower the drill string 916 within the well 914. As one example, such a hoisting system could include a crown block and a drawworks that cooperate to raise and lower a traveling block (to which the hook 922 is connected) via a hoisting line. The kelly 926 can be coupled to the drill string 916, and the swivel 924 can allow the kelly 926 and the drill string 916 to rotate with respect to the hook 922. In the presently illustrated embodiment, a rotary table 928 on a drill floor 930 of the drilling rig 912 can be constructed to grip and turn the kelly 926 to drive rotation of the drill string 916 to drill the well 914. In other embodiments, however, a top drive system could instead be used to drive rotation of the drill string 916.

During operation, drill cuttings or other debris may collect near the bottom of the well 914. Drilling fluid 932, also referred to as drilling mud, can be circulated through the well 914 to remove this debris. The drilling fluid 932 may also clean and cool the drill bit 920 and provide positive pressure within the well 914 to inhibit formation fluids from entering the wellbore. In FIG. 9, the drilling fluid 932 can be circulated through the well 914 by a pump 934. The drilling fluid 932 can be pumped from a mud pit (or some other reservoir, such as a mud tank) into the drill string 916 through a supply conduit 936, the swivel 924, and the kelly 926. The drilling fluid 932 can exit near the bottom of the drill string 916 (e.g., at the drill bit 920) and can return to the surface through the annulus 938 between the wellbore and the drill string 916. A return conduit 940 can transmit the returning drilling fluid 932 away from the well 914. In some embodiments, the returning drilling fluid 932 can be cleansed (e.g., via one or more shale shakers, desanders, or desilters) and reused in the well 914. The drilling fluid 932 may include an oil-based mud (OBM) that may include synthetic muds, diesel-based muds, or other suitable muds.

In addition to the drill bit 920, the bottomhole assembly 918 can also include various instruments. For example, as depicted in FIG. 9, the bottomhole assembly 918 can include a logging-while-drilling (LWD) module 944 and a measurement-while-drilling (MWD) module 946. Both modules can include sensors, housed in drill collars, that can collect data and enable the creation of measurement logs in real-time during a drilling operation. The modules could also include memory devices for storing the measured data. The LWD module 944 can include sensors that measure various characteristics of the rock and formation fluid properties within the well 914. The bottomhole assembly 918 can also include one or more additional modules, which could be LWD modules, MWD modules, sampling-while-drilling modules, or some other modules. It is noted that the bottomhole assembly 918 is modular, and that the positions and presence of particular modules of the assembly could be changed as desired. Further, one or more of the modules 944, 946, and 948 can be or can include a fluid sampling tool configured to obtain a sample of a fluid from a subterranean formation and perform downhole fluid analysis to measure various properties of the sampled fluid.

The bottomhole assembly 918 can also include other modules. As depicted in FIG. 9 by way of example, such other modules can include a pumpout module 948, turbine generator 950, a steering module 952, and a communication module 954. The pumpout module 948 includes a pump, which may be an electromechanical pump, for pumping formation fluid and/or out of the modules 944 and 946 described above. In some embodiments, the pump module 948 may include one or more mud check valves to direct the formation fluid in and out of the chambers of the pump module 950. In some embodiments, the pump module 950 may use one or more of the rotary check valve 100 described above to direct the flow of formation fluid in the pump module.

In one embodiment, the turbine generator 950 may be driven by flow of drilling mud through the drill string 916, out of the drill bit 920, and through the annulus 938 to the return conduit 940. As seen in FIG. 9, the drill string 912 is generally aligned along a longitudinal z-axis. Components of the drill string 912 may be located within the drill string at various radial distances from the z-axis, as illustrated by a radial r-axis. The steering module 952 may include a rotary-steerable system that facilitates directional drilling of the well 914. The communication module 954 can enable communication of data (e.g., data collected by the LWD module 944 and the MWD module 946) between the bottomhole assembly 918 and the surface.

The drilling system 910 can also include a monitoring and control system 956. The monitoring and control system 956 can include one or more computer systems that enable monitoring and control of various components of the drilling system 910. The monitoring and control system 956 can also receive data from the bottomhole assembly 918 (e.g., data from the LWD module 944, the MWD module 946, and the additional module 948) for processing and for communication to an operator, to name just two examples. While depicted on the drill floor 930 in FIG. 9, it is noted that the monitoring and control system 956 could be positioned elsewhere, and that the system 956 could be a distributed system with elements provided at different places near or remote from the well 914.

In other embodiments, the valve 100 may be used in other suitable systems or operations. For example, in some embodiments, other suitable systems or operations may include wireline, completions, drill stem testing, coiled tubing tools, and the like, including system and operations involving "dirty" fluids. In some embodiments, the valve 100 may also be used in inside of downhole tools with cleaner hydraulic fluid.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense and not for purposes of limitation.

What is claimed is:

1. A system, comprising:
   a downhole tool comprising a pump;
   a valve coupled to the pump, the valve comprising:
   a housing, the housing comprises a first pin and a second pin;
   a body member disposed in the housing;
   a first rotating member disposed in the body member and having a first sealing surface and a first fluid passageway, the first rotating member comprising a first helical groove configured to receive the first pin, wherein movement of the pin along the helical groove correlates to rotation of the first rotating member between a closed position and an open position;
   a second rotating member disposed in the body member and having a second sealing surface and a second fluid passageway, wherein the second rotating member is coupled to a stem member, and wherein the stem member comprises a second helical groove configured to receive the second pin, wherein movement of the second pin along the second helical groove correlates to rotation and translation of the second rotating member;
   wherein when the valve is in a closed position, the first sealing surface the first sealing surface engages the second sealing surface to close the first fluid passageway; and
   wherein when the valve is in an open position, the first rotating member is rotated to open the first fluid passageway.

2. The system of claim 1, comprising a spring disposed in the housing and configured to bias the first rotating member to a respective closed position.

3. The system claim 1, wherein the spring is configured to enable translation of the first rotating member to a respective open position when a fluid pressure compresses the spring.

4. The system claim 1, wherein the second rotating member comprises a second fluid passageway and in a respective open position, the first rotating member and second rotating member are rotated to align the first fluid passageway with the second fluid passageway.

5. The system of claim 1, wherein the stem member and the second rotating member are configured to translate along an axis and rotate around the axis when the valve is moved between the closed position and the open position.

6. The system claim 1, wherein the second rotating member is coaxial with the first rotating member.

7. The system of claim 1, wherein the body member and the first rotating member are configured to translate along an axis and rotate around the axis when the valve is moved between the closed position and the open position.

* * * * *